United States Patent
Albrighton et al.

(10) Patent No.: US 10,783,678 B2
(45) Date of Patent: Sep. 22, 2020

(54) SYSTEM AND METHOD FOR BLENDING OF BULK DRY MATERIALS IN OIL WELL CEMENTING

(71) Applicant: BJ Services, LLC, Tomball, TX (US)

(72) Inventors: Lucas Albrighton, Littleton, CO (US); T J McClure, Cheyenne, WY (US); Aaron James, Castle Rock, CO (US)

(73) Assignee: BJ Services, LLC, Tomball, TX (US)

(*) Notice: Subject to any disclaimer, the term of this patent is extended or adjusted under 35 U.S.C. 154(b) by 88 days.

(21) Appl. No.: 15/245,839

(22) Filed: Aug. 24, 2016

(65) Prior Publication Data
US 2018/0056258 A1   Mar. 1, 2018

(51) Int. Cl.
| | |
|---|---|
| *G06T 11/20* | (2006.01) |
| *B01F 5/24* | (2006.01) |
| *B01F 15/04* | (2006.01) |
| *B01F 3/18* | (2006.01) |
| *B28C 7/04* | (2006.01) |
| *B28C 5/04* | (2006.01) |
| *G05D 11/13* | (2006.01) |

(52) U.S. Cl.
CPC ............ *G06T 11/206* (2013.01); *B01F 3/18* (2013.01); *B01F 5/246* (2013.01); *B01F 15/0429* (2013.01); *B28C 5/04* (2013.01); *B28C 7/0418* (2013.01); *G05D 11/132* (2013.01)

(58) Field of Classification Search
CPC .......... G06T 11/206; B01F 3/18; B01F 5/246; B01F 15/0429; B28C 5/04; B28C 5/0418; G05D 11/132
See application file for complete search history.

(56) References Cited

U.S. PATENT DOCUMENTS

| | | | |
|---|---|---|---|
| 4,466,759 A | 8/1984 | Sweeney et al. | |
| 4,484,861 A | 11/1984 | Sweeney et al. | |
| 4,964,732 A * | 10/1990 | Cadeo | B01F 15/00142 366/142 |
| 5,289,877 A | 3/1994 | Naegele et al. | |
| 6,224,250 B1 * | 5/2001 | Kreinheder | B28C 7/02 360/16 |
| 6,540,393 B1 * | 4/2003 | Lyons | A61K 9/1682 366/181.5 |
| 6,923,568 B2 * | 8/2005 | Wilmer | B01F 5/0451 366/152.1 |
| 7,464,757 B2 | 12/2008 | Pessin et al. | |

(Continued)

FOREIGN PATENT DOCUMENTS

WO   WO 2008/139171   11/2008

OTHER PUBLICATIONS

U.S. Appl. No. 14/967,824, filed Dec. 14, 2015, James.

(Continued)

*Primary Examiner* — Marc C Howell
(74) *Attorney, Agent, or Firm* — Keith B. Willhelm

(57) ABSTRACT

The invention relates to an apparatus, system, and method for the bulk blending of dry component materials to produce a blended product mix. The apparatus utilizes a special construction that allows multiple bulk dry materials to be added simultaneously to create a blended mix compliant with a desired or specified mixture of cement components. The system is automated by use of a controller, and provides real-time data to a user as to rates and amounts of materials blended and delivered over time.

20 Claims, 10 Drawing Sheets

(56) References Cited

U.S. PATENT DOCUMENTS

| | | | |
|---|---|---|---|
| 7,686,499 B2 | 3/2010 | Dykstra et al. | |
| 7,905,653 B2 * | 3/2011 | Wilmer | B01F 3/0861 366/132 |
| 8,936,389 B2 * | 1/2015 | Bachman | A01K 5/00 366/141 |
| 2002/0048213 A1 * | 4/2002 | Wilmer | B01F 5/0451 366/136 |
| 2004/0057334 A1 * | 3/2004 | Wilmer | B01F 3/0803 366/136 |
| 2006/0146643 A1 * | 7/2006 | Allen | B01F 3/1221 366/134 |
| 2007/0151907 A1 | 7/2007 | Duhe et al. | |
| 2007/0286746 A1 | 12/2007 | Thrasher et al. | |
| 2007/0295509 A1 | 12/2007 | Pessin et al. | |
| 2010/0246312 A1 * | 9/2010 | Welker | B01F 3/04439 366/4 |
| 2011/0165286 A1 * | 7/2011 | Bachman | A01K 5/00 426/2 |
| 2013/0100760 A1 * | 4/2013 | Kemp | B01F 3/188 366/141 |
| 2015/0165394 A1 * | 6/2015 | Leininger | B01F 11/0094 241/98 |

OTHER PUBLICATIONS

"Static Mixers," Samahwa Mixing Tech. Co. Ltd., 2012, retrieved from https://web.archive.org/web/20120604232347/http://www.samhwamix.com/product/static_mixers/, 6 pages.

"Vee-Cone Blenders," Munson Machinery Company, Inc., 2012, retrieved from https://web.archive.org/web/20120220000333/http://www.munsonmachinery.com/products/mixing/Vee_Cone_Blender/index.asp, 2 pages.

"V-Shell Powder Blenders," Pharmatech, 2006, retrieved from https://web.archive.org/web/20060824145139/http://www.pharmatech.co.uk/vshell_blenders.html, 3 pages.

Dirienzo et al., "Porous poly(para-phenylene) scaffolds for load-bearing orthopedic applications," Journal of the Mechanical Behavior of Biomedical Materials, 2014, vol. 30, pp. 347-357, abstract only, 4 pages.

* cited by examiner

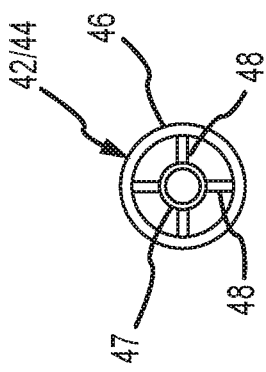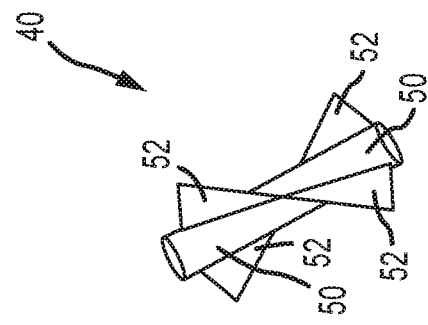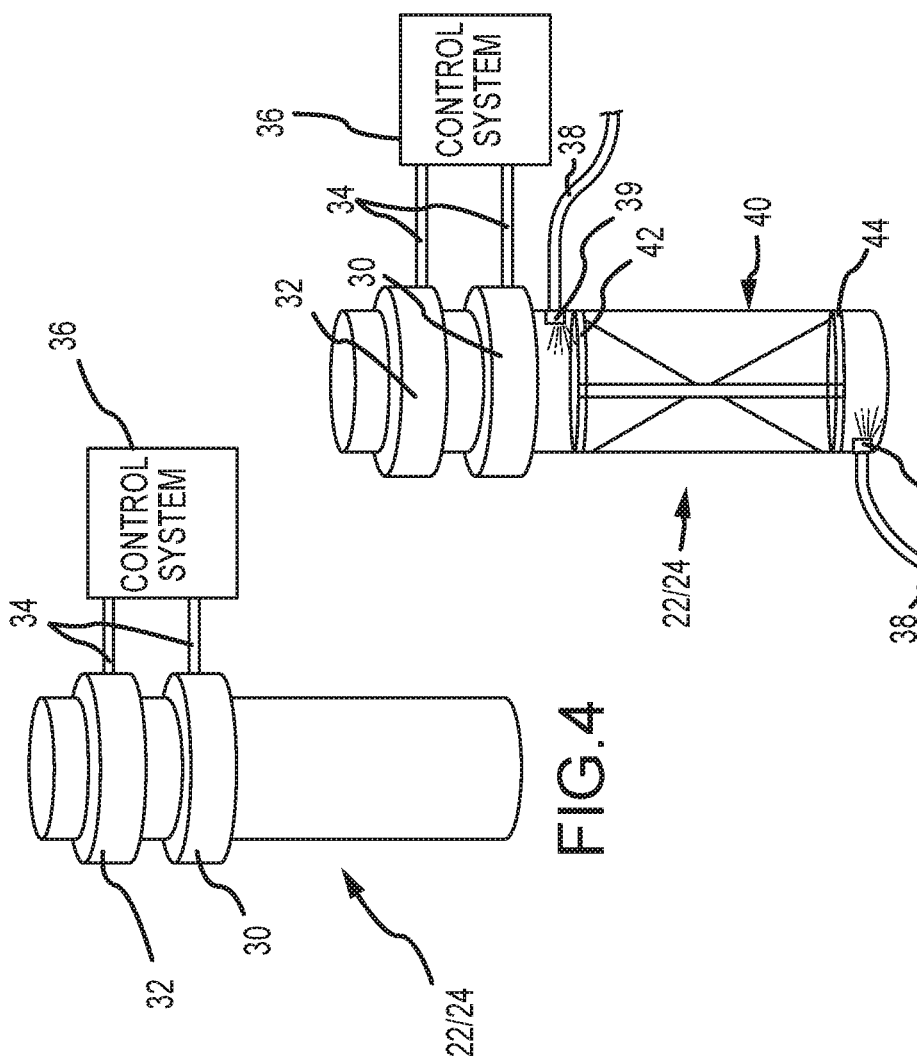

| | MATERIAL NAME | CONCENTRATION LB/SK | DESIGN MATERIAL RATIO SET POINT | TOTAL WT. LBS | CURRENT WT. LBS | CURRENT MATERIAL RATIO SET POINT |
|---|---|---|---|---|---|---|
| MATERIAL #1 | CLASS G | 47 | 1 | 23500.00 | 11141.17 | 1 |
| MATERIAL #2 | POZMIX | 37.735 | 0.80287234 | 18867.50 | 8944.93 | 0.80287234 |
| MATERIAL #3 | SILICA FLOUR | 16.45 | 0.35 | 8225.00 | 3899.41 | 0.35 |
| MATERIAL #4 | SILICA FUME | 10 | 0.212765957 | 5000.00 | 2370.46 | 0.212765957 |
| TOTAL | | 111.185 | | 55592.50 | 26355.97 | |

DESIRED # SKS: 500
CURRENT # SKS: 237.05
CONTROLLING MATERIAL: MATERIAL #1
INITIAL DELIVERY RATE: 50 SK/MIN

FIG.7

SYSTEM AND METHOD FOR BLENDING OF BULK DRY MATERIALS IN OIL WELL CEMENTING

FIELD OF THE INVENTION

The invention relates to a system and method of blending materials used for cementing a well bore, and, more specifically, to a system and method for the continuous bulk blending of oil well cement prior to or during cementing operations.

BACKGROUND

Before the cementing of an oil well can begin, much preparation is required. For example, a well bore diagram must be prepared and reviewed to determine the required fluids needed to complete the drilling job. The composition of the cement used for the cement job may need to be altered by additives depending on a number of factors related to the well's geology and the performance desired for well production. Once the cement composition is determined, the cement and required dry additives are blended in bulk, usually at a blending facility located at an oil and gas service company's field district location or a remote blending location. The bulk blending is usually performed by one of three methods.

One traditional bulk blending method entails pulling a portion of each dry bulk material used to make a specific cement blend in increments by first transferring the bulk materials to a bulk mixing container or tank. For example, those increments can be ⅓ of the total weight of the products needed to achieve blend/batch volumes. The bulk material is layered above and below additives or sack materials, which are typically added in increments of ½ of the total weight of the sack materials. This layering, sometimes referred to as a "sandwich" method, assists in creating a homogenous product.

A schematic diagram of the sandwich method is shown in prior art FIG. 1. The dry materials to be used include bulk materials 12 and additives 14 that are initially placed in a scale tank 10 where direct measurement of the material weights can be made using load cells. Once all the dry materials are properly transferred into the scale tank 10, the layered materials are transferred multiple times—typically between four and five—between other tanks such as between multiple scale tanks 10 or between a blend tank 16 and a scale tank 10, as shown in prior art FIG. 2. Pneumatic conveying methods are used throughout all mixing/blending steps to initially transfer the materials from bulk silos to blend or scale tanks as well as between multiple blend or scale tanks.

The multiple mixing or blending steps causes the bulk materials and additives to be completely mixed into a homogenized blend. However, the mixing or blending process is both a time and equipment intensive effort. Further, the process can only be executed in locations where a blending facility is located. Even with a mobile bulk blending facility that can incorporate this method of blending, the single batch approach to mixing and blending still requires each separate batch to be stored in separate storage containers/tanks, which further adds to the cost of blending/mixing operations since multiple separate containers/tanks must be used.

A second known bulk blending method involves pneumatically transferring all the dry materials, including all bulk and sacked materials, into a blend tank. Typically, air nozzles or jets located on the periphery of the blend tank inject air into the blend tank and pneumatically mix the added materials over a designated period of time. The length of time needed to obtain a homogenous blend is a function of the dry material particle size and specific gravity of the dry materials, but may typically range from 8-12 minutes. While this method can achieve blending in less time than the first bulk blending method, it is still a relatively slow process. Further, while this pneumatic blending method does not require transferring the dry bulk materials between various blend tanks and scale tanks (since blending is achieved by pneumatic force within a single tank), this method still has its drawbacks because at least one large special blending tank is required along with a robust source of high pressure air.

A third common bulk blending method is a combination of the two methods described above. More specifically, dry bulk materials and additives are placed within a blend tank and are arranged in layers according to the sandwich method. Then, air nozzles located on the periphery of the blend tank inject air into the blend tank and mix the materials over a period of time. Partially mixed materials can be further blended by passing the materials between blend and scale tanks if further blending is required. While this hybrid method adds some flexibility to a blending operation, it still suffers from time, coordination, and location drawbacks.

One other prior art method for blending of bulk blending of dry materials can be achieved through the use of a ribbon blender. The ribbon blending process is a more mechanical method than the previously describe methods, as it requires the use of an auger assembly employed within a large blending vessel. Dry materials are added to the vessel and the auger assembly stirs and agitates the dry materials continuously until a homogenous blend is achieved. The length of time needed to achieve homogenization for the materials depends upon the material properties and quantities of the bulk materials and additives. However, this method is comparatively inefficient because of the long blending times required for all mixes which therefore limits output from the blending vessel. A single blending vessel may simply be inadequate to deliver the amount of mixed materials required during a scheduled project day and therefore multiple blending vessels are required which adds significant cost to a blending operation.

Considering the shortcomings of the prior art methods described above, there exists a need for a more versatile and efficient blending method and system that allows for diverse cements blends to be created with a minimum of equipment and manpower. There is also a need to improve portability of blending processes, such that cement blends are more easily delivered to a drilling site, which may allow cement blends to be prepared with much less labor, in less equipment intensive ways, and to also prepare the cement blends more quickly.

SUMMARY

The present invention is directed to a system and method for the continuous bulk blending of materials for use in oil well cementing processes.

In one preferred embodiment of the system of the invention, an apparatus is provided including a plurality of tanks each having a supply line that connects to a common mixing or blending line. A first end of each supply line connects to its corresponding tank and a second opposite end of each supply line communicates with the common mixing line.

In another preferred embodiment of the invention, a method is provided including the steps of (1) providing the apparatus having the plurality of tanks, supply lines, and common mixing line; (2) providing a plurality of dry component materials, wherein each of the dry component materials are stored in a corresponding tank; (3) determining a desired composition for a blended product, wherein the blended product is a mixture of the plurality of dry component materials and selected additives; and (4) delivering each of the dry component materials through each of the respective supply lines at a predetermined rate such that the dry component materials and additives are adequately blended within the mixing line resulting in a blended product having a desired blended product composition.

In order to stabilize a downhole emplacement such as a bored or drilled hole forming a well, the cement blend or mixture to be delivered downhole must include various dry component materials to obtain required performance characteristics for the particular job. Various dry component materials that may be required for a job may include cement, silica, heavy weight materials, fly ash, lime, silica fume, hollow spheres or beads, and various other industry ingredients. Each of these ingredients will impact the performance characteristics of the final cement blend utilized in the job. Examples of types of cement and other dry materials and additives may include the following:

- Cement—Various cement varieties may be utilized including, but not limited to, Classes C, G, H; Types I, II, III, I-II, II-V, and V; ultrafine cement; and lightweight cement, e.g., TXI and OneCem. The purpose of the cement is to generate compressive strengths and is a key base component in any cement mixtures.
- Silica—Various examples may be utilized including, but not limited to, 100 Mesh, 200 Mesh (silica flour), and 325 Mesh. The primary use of silica is to combat strength retrogression in cement above temperatures of 230° F. Silica may additionally be used as a weighting agent for spacers or cement.
- Heavy Weight Materials—Various examples include, but are not limited to, barite and hematite. These components aid in mixing high density cements and may also be used as a weighting agent for spacers.
- Fly ash (Pozmix)—Various examples include, but are not limited to, Class F, Class C, and Pumice/Tuff. This component is used as an extender in lighter weight cement systems to aid in compressive strength development and the reduction of water.
- Lime—This component may be used as an extender in lighter weight cement systems and can also provide some level of viscosification. Lime further helps to enhance the compressive strengths of the overall mixture.
- Silica Fume—This component may be used as an extender, allowing for competent slurry performance in lighter weight cement systems. It can further help with viscosification and strength development of the mixture.
- Hollow Spheres or Beads—This component may be used to reduce water in the cement systems, which aids in developing light weight cements that are able to develop higher compressive strengths than conventional, water-extended lightweight slurries.

Once required components of a cement mix are determined for a job, each component is loaded into a separate tank or container in preparation for mixing. Each component is then released from its corresponding tank/container according to a sequence that enables the components to be most efficiently mixed during travel of the components through the supply lines into the common mixing line. In short, the components can all be adequately mixed within the common mixing line to therefore achieve a desired composition for a designated cement mixture. All components are mobilized pneumatically.

The supply lines and common mixing line may each include a variety of controls to ensure correct amounts of the component materials are delivered to the common mixing line and delivered downstream to a discharge line. These controls may include throttling valves and mass flow meters. The flow meters measure the amount of material(s) conveyed and then provide an input signal to a controller which in turn, sends a control signal to one or more throttling valves in each supply line or the mixing line to control the rate of material(s) passing through the valve(s) as well as to determine when to close the valve(s).

The common blending or mixing line may have a number of features to ensure the component materials are adequately blended prior to delivery of the materials downstream to discharge point. One type of feature includes a mechanical mixing element, such as one or more static mixers that are installed in-line. The static mixers have selected blade arrangements that cause the materials passing through the mixers to be blended as the materials pass. A series of static mixers can be employed to achieve a desired blending sequence. For example, one or more coarse static mixers can be employed upstream in which the blades are larger and have relatively less helical twist, and one or more fine static mixers can be employed more downstream with smaller blades and greater helical twists. Coarse mixing first with downstream fine mixing may provide a more complete and reliable mixing sequence for a broader range of differing types of cement blend components. Of course each of these static mixers is employed within the single common mixing line.

The common mixing line itself may have other features that contribute to a complete mixing of the components to achieve a desired homogenous mixture. Parameters of the common mixing line that can be modified to optimize mixing includes the length and diameter of mixing line, as well as the shape of the common mixing line. For the shape, it is contemplated it may have one or more bends or twists, which may further assist in advancing a more complete mix or blend of the cement components. Additionally, the pneumatic force of the air to convey the components can be modified to assist in mixing/blending. That is, various parameters of pneumatic force can be selected to increase mixing/blending efficiency to include the magnitude of the force of the air through the common mixing line, selected pulsing of the air through the common mixing line, and addition of air jet streams through nozzles that communicate with the interior of the common mixing line.

Each of the supply lines may also incorporate their own static mixing device to ensure that each of the components when delivered to the common mixing line are not delivered with any clumps or other irregularities which may prevent them from being adequately mixed with the other components. For example, in high humidity conditions, one or more of the components may slightly harden and therefore become clumped if stored for an extended period prior to delivery. In this circumstance, having a static mixing device for selected supply lines may help to ensure better downstream mixing.

After a homogeneously blended product is conveyed through the common mixing line, the product travels through a discharge line to a pump truck or bulk truck for transportation to a selected job site. However, the blending method of the invention may be entirely conducted at the job site as well. In such an instance, all the individual bulk materials are delivered to the location separately and the cement is blended while the bulk materials are discharging to the pump truck.

Once the blended batch of materials is at the job site, downhole pumping operations may begin. The bulk material mixing system and method of the invention described herein may be utilized as a precursor step to the downhole cementing method described in U.S. Pat. No. 10,316,618, herein incorporated by reference in its entirety.

Considering the above features and attributes of the invention, in one aspect, the invention may be considered a system especially adapted for mixing dry material components for use as oil well cement during cementing operations, the system comprising:

a plurality of tanks;

a plurality of component material supply lines wherein each of the plurality of supply lines has first and second ends, the first end of each being in fluid communication with a corresponding tank of the plurality of tanks;

a common mixing line, wherein the second end of each of the plurality of supply lines is in fluid communication with an upstream end of the common mixing line;

wherein at least one the plurality of component material supply lines or the common mixing line includes a static mixer disposed therein to mix components passing through the line in which the static mixer is installed;

wherein at least one of the plurality of component material supply lines includes a mass flow meter to measure a mass of the component material passing through the at least one supply line;

wherein at least one of the plurality of component material supply lines includes a flow throttling valve to control material components passing through the at least one supply line;

a controller communicating with at least the mass flow meter and the throttling valve wherein a measured mass of a selected component material as an input to the controller allows the controller to issue a control command to the throttling valve to meter a desired amount of a component material there through; and at least one user interface generated by the controller for viewing by the user, the user interface providing an indication of a real-time status of at least one component material delivery rate or weight.

According to another aspect of the invention, it may be considered a method especially adapted for mixing dry material components for use as oil well cement during cementing operations, the method comprising:

providing a plurality of tanks;

providing a plurality of supply lines wherein each of the plurality of supply lines has a first and a second end, the first end being in fluid communication with a corresponding tank of the plurality of tanks;

providing a common mixing line, wherein the second end of each of the plurality of supply lines is in fluid communication with an upstream end of the common mixing line;

wherein at least one the plurality of product supply lines or the blended product supply lines includes a static mixer disposed therein to mix products passing through the line in which the static mixer is installed;

wherein at least one of the plurality of product supply lines includes a mass flow meter to measure a mass of a product passing through the at least one supply line;

wherein at least one of the plurality of product supply lines includes a flow throttling valve to control components passing through the at least one supply line;

providing a controller to automatically determine control parameters for delivery of the products to include material weights or delivery rates of the products;

determining a desired composition for a blended product, wherein the blended product is a mixture of a plurality of products; and delivering each of the products through each of the respective supply lines at a determined rate such that the blended product is formed in the mixing line having a desired blended product composition; and wherein at least one current material ratio set point value is determined and subsequently utilized by the controller to control delivery of the components to achieve a desired blended product.

According to yet another aspect of the invention, it may be considered a mixing apparatus especially adapted for mixing dry material components for use as oil well cement during cementing operations, the apparatus comprising:

a plurality of supply lines wherein each of the plurality of supply lines has first and second ends, the first end being in fluid communication with a corresponding tank of the plurality of tanks;

a common mixing line, wherein the second end of each of the plurality of supply lines is in fluid communication with an upstream end of the common mixing line;

wherein at least one the plurality of supply lines or the common mixing line includes a static mixer disposed therein to mix components passing through the line in which the static mixer is installed;

wherein at least one of the plurality of supply lines includes a mass flow meter to measure a mass of a dry product passing through the at least one supply line;

wherein at least one of the supply lines includes a flow throttling valve to control components passing through the at least one supply line; and a controller communicating with at least the mass flow meter and the throttling valve wherein a measured mass of a selected component material product as an input to the controller allows the controller to issue a control command to the throttling valve to meter a desired amount of a component material there through; and at least one user interface generated by the controller for viewing by the user, the user interface providing an indication of a real-time status of at least one component material delivery rate or weight.

According to yet another aspect of the invention, it includes a method for mixing dry material components for use as oil well cement during cementing operations in which components of the mix are delivered through respective supply lines and measurements of the amounts of materials delivered are determined by rate and time. More specifically, with each known ingredient, as well as the known diameters and lengths of the supply lines, the ingredients can be metered from their respective component tanks. In this regard, volumetric flow rates can be predetermined for each ingredient in which confirmation of total amounts delivered can optionally be incorporated within the mixing tank which has received the components. Therefore, according to this method, is not required for each of the components to be separately weighed prior to reaching the mixing tank. Rather, prior data can be used to determine the flow rates of each separate component ingredient so that redundant weighing is not required for each of the components.

Further descriptions of advantages, benefits, and additional aspects of the invention will become evident from the accompanying drawings and description herein. All aspects of the invention, whether mentioned explicitly in this Summary section or not, are considered subject matter for patent protection either singly or in combination with other aspects of this disclosure. Accordingly, such aspects disclosed herein below and/or in the drawings that may be omitted from, or less than fully described in, this Summary section are fully incorporated herein by reference into this Summary. In particular, all (any) claims of the Claims section below are fully incorporated herein by reference into this Summary section.

BRIEF DESCRIPTION OF THE DRAWINGS

FIG. 4 shows a schematic diagram of a supply line or common mixing line of the invention with monitoring and control features including a throttling control valve and a mass flow meter;

FIG. 5 shows a schematic diagram of a supply line or common mixing line of the invention with monitoring and control features including the throttling control valve and the mass flow meter and a static mixing device located downstream of the of valve and flowmeter;

FIG. 5A shows a schematic diagram of the shape of the top and bottom retaining rings of the common mixing line;

FIG. 5B shows a schematic diagram of internal static mixing element of the common mixing line;

FIG. 7 shows a user interface of example automation software associated with the invention;

DETAILED DESCRIPTION

Figure 1:
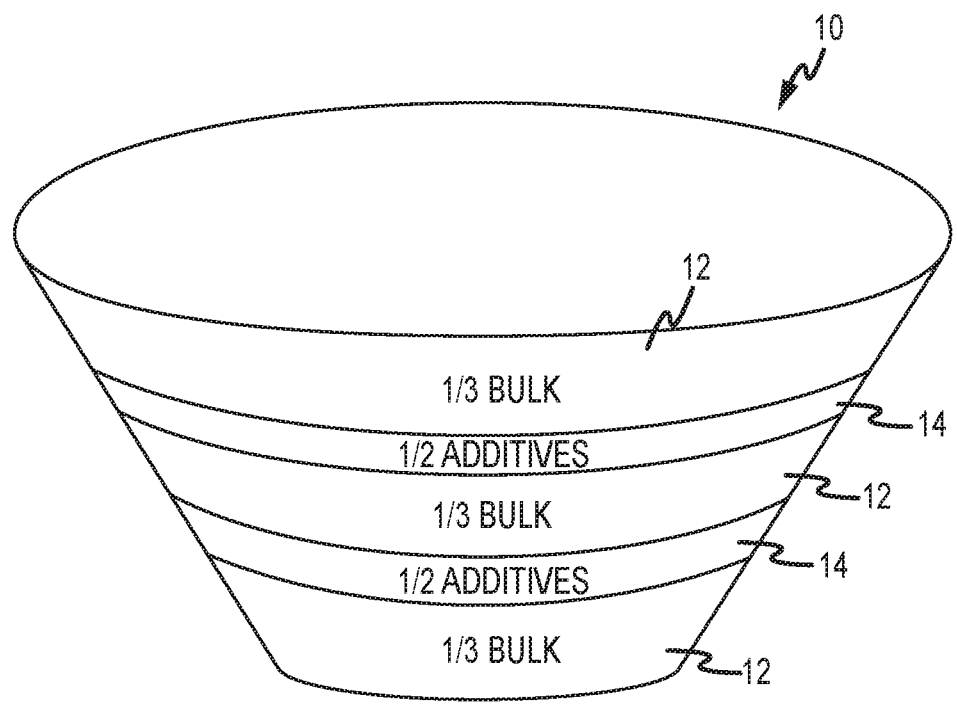
FIG. 1 shows an example prior art mixing apparatus and mixing method according to a "sandwich" method.
Figure 2:
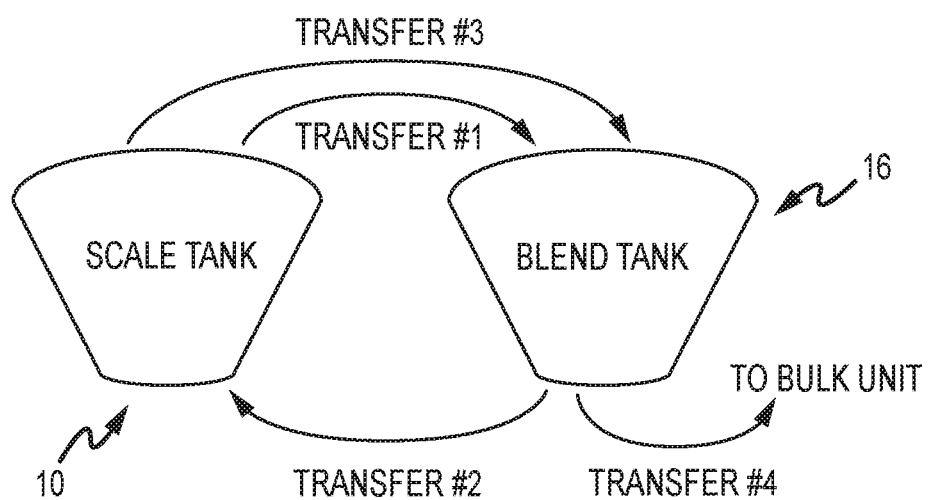
FIG. 2 shows an example prior art mixing system.

As discussed in the summary of the invention, FIGS. 1 and 2 illustrate known prior art apparatuses and methods for handling the mixing of component dry materials.

Figure 3:
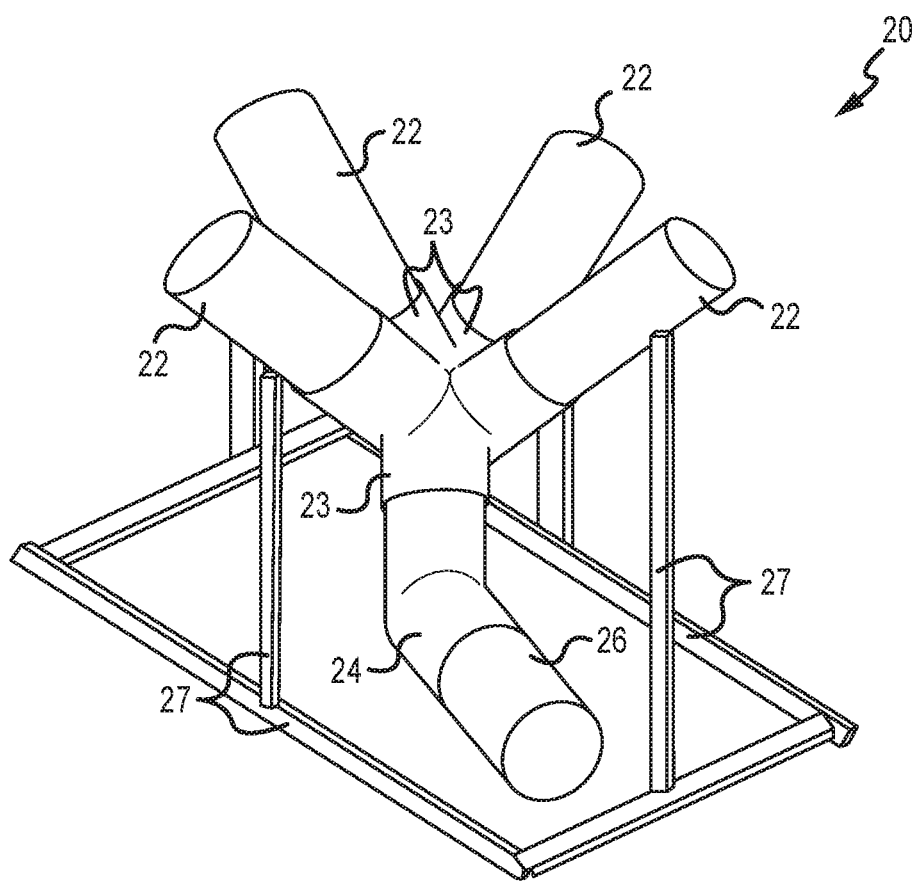
FIG. 3 shows a schematic representation of the bulk mixing apparatus according to one embodiment of the system of the invention.

FIG. 3 shows a schematic representation of an exemplary bulk mixing apparatus 20 according to one preferred embodiment of the apparatus of the present invention. As shown, the bulk mixing apparatus 20 has a plurality of dry product supply lines 22 that converge and are joined at a manifold 23 which in turn has an outlet that joins with a downstream common mixing line 24. The common mixing line 24 communicates downstream with a discharge line 26 for transportation of the mixed materials to a job site. The lines 22/24 and the manifold 23 are shown as supported by a frame structure 27.

It should be understood that the exemplary embodiment of FIG. 3 is a schematic representation that shows basic components of the system, and therefore the particular size, shape, and length of each of the components can be modified according to the particular job site and location where the system may be installed. Further, the particular support structure 27 used may also be modified to provide the necessary support to the components of the system.

The embodiment shown utilizes four supply lines 22 which each receive a different product from a corresponding dry product container (not shown). However, it should be also understood that the number of supply lines may vary based on the particular cement blend required. Accordingly, the bulk mixing apparatus 20 may utilize as few as two supply lines, but may also include more than four supply lines depending on the number of ingredients/components to be mixed. Moreover, it is envisioned that the apparatus may be designed such that supply lines can easily be added and removed as needed. For example, the bulk mixing apparatus may be of a modular design, where each of the components is designed to be easily added or removed from the apparatus. In this regard, the supply lines may each incorporate couplers (not shown) which allow the supply lines to connect and disconnect with the common mixing line 24. The couplers provide a sealed connection with the common mixing line so there is no material loss if various supply lines are routinely connected and disconnected.

According to another embodiment of the invention, it may be considered an automated computer controlled system in which a user enters a desired concentration of each ingredient/component as a function of a blended total to be created for the desired cement mix. The system automatically calculates the necessary flow rate for each component and monitors the actual flow rate, as needed, for each of the components to be mixed. Amounts of components conveyed are measured by the one or more mass flow meters, and a controller generates control commands to selectively open and close various throttling valves to obtain the pre-determined batch composition as set by a user.

Each dry product container or tank with its corresponding supply line acts to transport each corresponding dry component at a predetermined rate to the downstream common mixing line where the various dry components converge at various rates to produce a mixed product having a desired composition. A schematic of one embodiment of the supply lines and mixing line and various components of the lines are shown in FIGS. 4, 4A and 4B.

Referring first to FIG. 4, this shows a schematic side elevation view of a supply line 22 or common mixing line 24. As shown, the supply/mixing lines may each include a mass flow meter 30 and a product throttling valve 32. In another preferred embodiment, the common mixing line 24 does not include a product throttling valve 32, while the supply lines 22 will include both a mass flow meter 30 and a throttling valve 32.

The flow meter 30 and throttling valve 32 each further include a data cable 34 that connects to the control system 36. The control system 36 includes a processor and instructions for execution by the processer such as firmware or software. Use of an automated system enables a user to control and monitor the flow of each of the various ingredients or components, as well as to control the downstream mixed product to be delivered to a job site. More specifically, the throttling valve 32 is used to control the flow of individual products. The valve position is controlled by feedback from the mass flow meter 30 mounted in-line with the valve. The desired mass flow rates may be determined from user specified set points in the control logic of the controller, such as user selectable parameters from a menu in the system software. Also, the mass flow meters can also be used to measure flow rates for both dry and liquid components that may be used to create a batch. As a flow meter may be used in a supply line 22, the flow meter measures the mass or flow rate of each individual material component to be added whereas in a mixing line 24, a flow meter measures the total mass or flow rate of all the individual products. Accordingly, use of a mass flow meter in the mixing line is used to determine the total of the ingredients used to obtain the desired final mixed product composition. More specifically, if a flow meter is used in the common mixing line 24, a flow meter at that location measures the combined mass or flow rates of the material components such that an additional control input is provided to confirm the flow rates measured by the upstream flow meters in the respective supply lines.

It should therefore be appreciated that a control loop is created in which the flow meters provide an input to the control processor, and the throttling valves are one type of control output which may be used to control the rate of dispense of each of the material components. For the startup of a newly installed system, calibration checks will be conducted for the flow meters and throttling valves to initially "tune" the system. For example, component material deliveries can be conducted and then the throttling valves may be initially set to be opened/closed a certain percentage based upon known measured flow rates/measured flow masses. As additional calibrations are conducted or as subsequent batches are blended during operations, the controller of the control system can further refine exact throttling valve positions based upon the type of component materials being delivered and their corresponding flow rates/masses. In this way, the control loop of the system may continue to add precision and accuracy for blended products used at a jobsite.

FIG. 5 shows a schematic cross-sectional view of a supply line 22 and/or a mixing line 24 that further incorporates an in-line static mixing device 40. The mixing device 40 may be held in place by a pair of retaining rings, shown in this figure as a top retaining ring 42 and a bottom retaining ring 44. In another preferred embodiment, only the common mixing line 24 includes the mixing device 40 while the supply lines have no separate mixing features. When a static mixer 40 is located in a supply line, it assists in more even or steady flow of the ingredient/product through the common mixing line and assists in mixing of the ingredient/product which aids in breaking up any clumps or other irregularities in the components so the components maybe achieve a more homogeneous mixture. A static mixer in the common mixing line contributes to most of the mechanical mixing of the group of component ingredients. Multiple static mixers may be installed in the mixing line if a single static mixer does not sufficiently homogenize the dry ingredients/products. The retaining rings serve to isolate the static mixer within the line in which it is installed so there is no or limited product bypass around the periphery of the static mixer. It is also contemplated that one or more static mixers may be installed in the common mixing line both upstream of and downstream of the flow meter which may be used to measure mass of the mixture.

FIG. 5 illustrates yet another feature which may be optionally added to the supply lines and/or the common mixing line, namely, air jets which provide jets of compressed air to enhance mixing of the components. As shown, the air jets comprise compressed air lines 38 with nozzles 39 which attach to the supply/mixing line. The nozzles 39 may be directed at the desired angle with respect to the line to which it is installed to provide the desired mixing effect(s). The air jets may be installed upstream or downstream of the static mixing device 40 as shown, as well as installed within the portion of the line occupied by the static mixing device.

The mixing device of the system may be designed such that the supply lines and/or common mixing line may have access provided to the interiors of the lines by respective hinged panels (not shown), or hammer union connections. Access may be required to the interior of the lines for various reasons to include routine maintenance, repair, or replacement of static mixers mounted within the lines.

The top and bottom retaining rings 42, are shown in greater detail in FIG. 5A. As shown, the retaining rings each include an inner ring outer ring member 46, an inner ring member 47, and a plurality of spokes or radial projections 48. In this configuration, the retaining rings can hold a mixing device 40 so that it cannot slide or travel within the line in which it is installed. FIG. 5B illustrates an example mixing device 40 and as shown, it may include a longitudinal element such as a central support tube 50 and a plurality of protrusions or blades 52 attached to the central support tube 50. The blades 52 may be arranged in a desired pattern, and may be selected in desired shapes and sizes to influence desired mixing results. For the specific example shown in FIG. 5B, the static mixer has a plurality of blades 52 arranged in a helical pattern longitudinally along the central support tube 52. The static mixer may be constructed with readily available materials such as horizontal bars, tubes, ribbon mixers, etc. the static mixer provides enhanced mixing and in some cases may be required to provide the desired product mix homogeneity. Due to material particle sizes and product densities, different mixing/blending components may be required to ensure homogenization. Because the blending system is modular, adjusting the actual blending/mixing device(s) can be done quickly at the mixing facility or on location. In this regard, it is therefore contemplated that the invention incorporates modular or easily replaceable mixing devices, flow meters, and control valves so that the system of the invention can be easily adapted for a wide range of cement mix specifications.

Figure 6A:
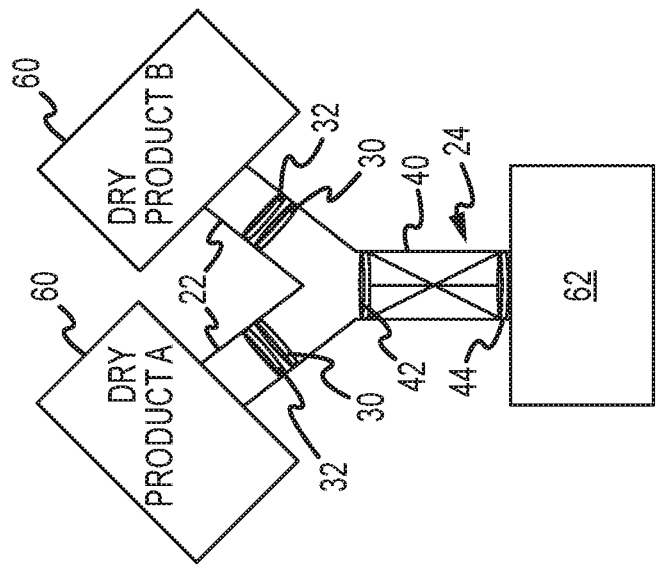
FIGS. 6A-C show schematics of the system at various steps or intervals within a mixing method.
Figure 6B:
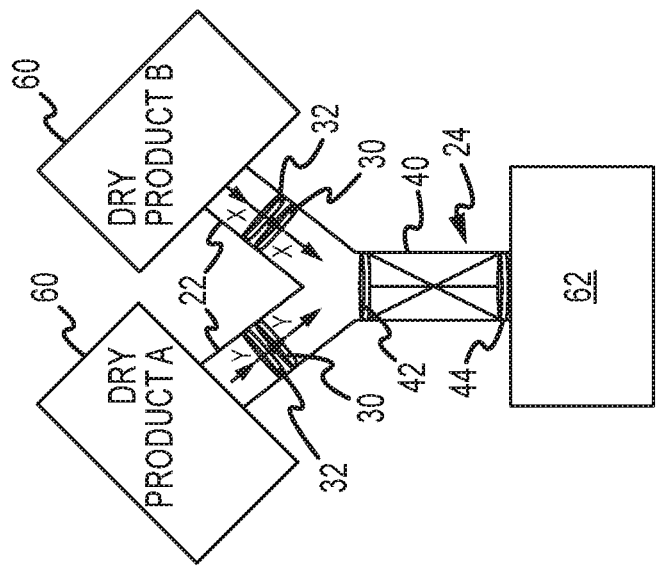
Figure 6C:
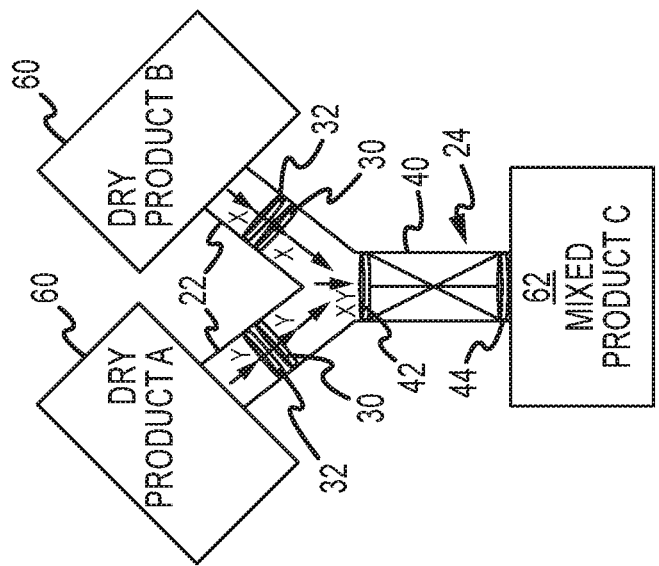

FIGS. 6A-C show schematics of a bulk mixing system at various steps or times in a mixing method according to another embodiment of the present invention. First, FIG. 6A shows the bulk mixing system before mixing has started. The bulk mixing system includes at least two dry product storage containers 60, each of which holds a different dry product (A and B), a supply line 22 for each of the storage containers 60, and a common mixing line 24 that communicates with both supply lines 22. Each supply line 22 is shown as having a throttling valve 32 and a mass flow meter 30. The mixing line 24 is shown with a static mixer 40 as mounted between top and bottom retaining rings 42 and 44. As mentioned, the supply lines 22 may further include their own static mixers, and the common mixing line 24 may further include its own throttling valve and mass flow meter. The mixed products flowing downstream may be captured in a mixed product container 62.

FIG. 6B shows the system in a next time sequence as products are released from the containers 60. As shown, dry product A begins to flow through its respective supply line at a rate depicted by y, while dry product B begins to flow through its respective supply line at a rate depicted by x. Rates x and rate y are set such that the final mixed product has the desired composition for a particular job. Moreover, the rates of the dry material flow may be controlled in each of the supply lines using the respective throttling valves 32. The throttling valves may be controlled automatically by feedback from the mass flowmeters 30 and the desired mass flow rates are set based upon predetermined user specified set points. The throttling valves 32 may also be controlled manually by the user in the event there are circumstances that do not require or are not possible to control automatically.

FIG. 6C shows the system in a next time sequence as mixing takes place. As shown, dry product A and dry product B come together just before entrance to the mixing line, where the combined products therefore have a new flow rate of xy, which is a result of the combination of the flow rates of dry product A (y) and dry product B (x). The dry product A and B then flow through the static mixer 40 to achieve a desired homogenization of the mixed components. Finally, the mixed products A and B are transferred, such as by gravity force, to the mixed product storage container 62, where the mixed product may then be transported to a job site. The mixed product can also be directly discharged to a cement mixing and pumping unit on location.

FIG. 7 shows an example user interface 70 in the form of a user input screen for entering desired parameters for a particular mixing job to be accomplished. More particularly, FIG. 7 shows a material input screen that allows a user to input a variety of factors relevant to a particular mixing job. At the top of the screen, four fields are displayed for data entry by the user. The "desired # Sks" field 72 is where the user enters the total number of sacks of component materials that are to be blended for a pre-designated mix batch. Many component materials are provided in standard sacks with known weights however it should be understood that this input parameter is not limited to just standard sack packages, and may therefore represent any type of user input in which an amount of a component material is being added. The "Current # Sks" field 74 shows the real time mass quantity of the component material that has already been added to the system. This real time value is calculated based off the bulk densities of all the components, and the total mass of each product transferred through the system as measured by the individual mass flow meters. More specifically, in the example of FIG. 7, field 74 shows the number of sacks that have been blended and this amount shown is calculated by dividing the total current weight discharged by the system (26,355.97 lbs), and then dividing that by the sack weight (111.185 lb/sk).

The "Controlling Material" option 76 is user defined. This field allows the user to specify which material(s) will be used to control the delivery rate of all the other components being delivered. The throttling valve position on each product line may be monitored. If the controlling material's throttling valve changes, the other product line throttling valves will be automatically adjusted to ensure that the proper ratio set point is maintained. The ratio set point is defined by the specific material concentration (in lb/sk) divided by the material concentration (in lb/sk) of the controlling material.

The "Initial Delivery Rate" 78 is used as a starting point when starting the blending process. In this regard, the particular selected material designated as the controlling material has its corresponding throttling valve that is maintained in a full open position, and the remaining component material to be delivered, referred to as slaved products, each have their throttling valves opened to a predetermined percentage that is based on the current Ratio Set point value. The percentage that a slaved product valve should be open at the initiation of the blending process is determined by the following equation:

$$\% \text{ Valve Open} = (\text{Design Material Ratio Set Point}) \times 100$$

FIG. 7 further shows a table 80 that displays the materials used in a particular mixed batch for a designated job, as well as various parameters for each material. The "Material Name" field allows the user to input each of the materials to be used in the job. Typically, the cement being used will be input into the Material #1 field, while additives will be inserted into the additional Material # fields. In the example of this FIG. 7, there are four materials to be used for the job including Class G, Pozmix, Silica Flour, and Silica Fume. However, a user may input any desired number of materials for a particular cement mix requirement and thus a batch is not limited to just four materials. Moreover, while this figure shows Class G as the type of cement selected, it should be understood that data entry selections shown in this figure are only exemplary, and any other types of materials or classifications of materials can be used. In the case of types of cement, any other types of cements may be selected including Classes C, G, and H; Types I, II, III, I-II, II-V, and V; ultrafine cement; and lightweight cements, e.g., TXI, OneCem, or others. Moreover, while Pozmix, Silica Flour, and Silica Fume are shown in FIG. 7, it is envisioned than any standard additives may be selected including various silicas, e.g., 100 Mesh, 200 Mesh (silica flour), and 325 Mesh; heavy weight materials, e.g., barite and hematite; fly ash/Pozmix e.g., Class F (byproduct of the coal power plant burning process), Class C (byproduct of the coal power plant burning process), and Pumice/Tuff (naturally occurring fly ash created from volcanic activity); lime; silica fume; hollow spheres/beads, and others.

For each material selected and entered, a user may input into the "Concentration" field of the table 80 a particular desired concentration for each material. In FIG. 7, starting with Material #1, the inputted concentrations, in lb/sk, are 47, 37.735, 16.45 and 10, for a sum total concentration of 111.185 lb/sk (pounds per sack). The next column of the table 80 shows the "Design Material Ratio Set Point" field, which is used by the system to control the material throttling valves at the initiation of the blending process. It is also used by the system to ensure the proper amount of the material is being added during the blending process by comparing the designed material ratio set point to the current material ratio set point. If these two values do not match, the system will automatically adjust the specific product throttling valve to obtain a better match. As shown in FIG. 7, the current values for Materials #1-#4 are 1, 0.80287234, 0.35 and 0.212765957 respectively. The "Designed Material Ratio Set Point" is automatically calculated by the following equation:

$$\text{Product } A\text{-Designed Material Ratio Set Point} = (\text{Product } A \text{ Material Concentration}/\text{Controlling Material Concentration})$$

Next, the "Total Weight" field is automatically calculated by the system based on consideration of the respective material concentrations and number of material sacks required. The values shown for Materials #1-#4 are 23500.00, 18867.50, 8225.00, and 5000.00, respectively. More specifically, the total weight is determined by the following equation:

$$\text{Total Weight} = (\text{Total Concentration lb/sk}) \times (\text{Desired \# Sks})$$

The "Current Weight" is a real-time value automatically measured and monitored by the system. This value is calculated by multiplying the current delivery rate (in lb/sec) by the total number of elapsed seconds from the last rate measurement. The system then adds this quantity to the previous measured total weight. The values shown for Materials #1-#4 are 11141.17, 8944.93, 3899.41, and 2370.46, respectively. The "Current Weight" field may therefore be considered a dynamic, changing value which is displayed to the user as component materials are being delivered as a mixture downstream.

Lastly, the "Current Material Ratio Set Point" is calculated continuously during the blending process. This ratio is used to monitor that the specific product is being added at the correct ratio to the controlling material so the desired blend of materials is achieved. The values shown for Materials #1-#4 are 1, 0.80287234, 0.35, and 0.212765957, respectively. The Current Material Ratio Set Point is calculated as follows:

$$\text{Product } A - \text{Current Material Ratio Set Point} = \frac{[\text{Product } A \text{ Delivery Rate (lb/sec)}] \times [\text{Date Sample Rate (Sec)}]}{[\text{Controlling Material Delivery Rate (lb/sec)}] \times [\text{Date Sample rate (Sec)}]}$$

The "Current Material Ratio Set Point" is therefore also a dynamic, changing value which is displayed to the user. Displayed differences between the Current and Design Material Ratio Set Points can also assist the user in evaluating the accuracy of the system, and also to troubleshoot potential problems in a delivery sequence. For example, an observed atypical increase or decrease in a Current Material Ratio Set Point for any one material can indicate a delivery malfunction for the corresponding material(s). This information coupled with additional graphical information described for FIGS. 8 and 9 can assist the user in troubleshooting and validating the accuracy of a delivery sequence for a blended product.

Figure 8:
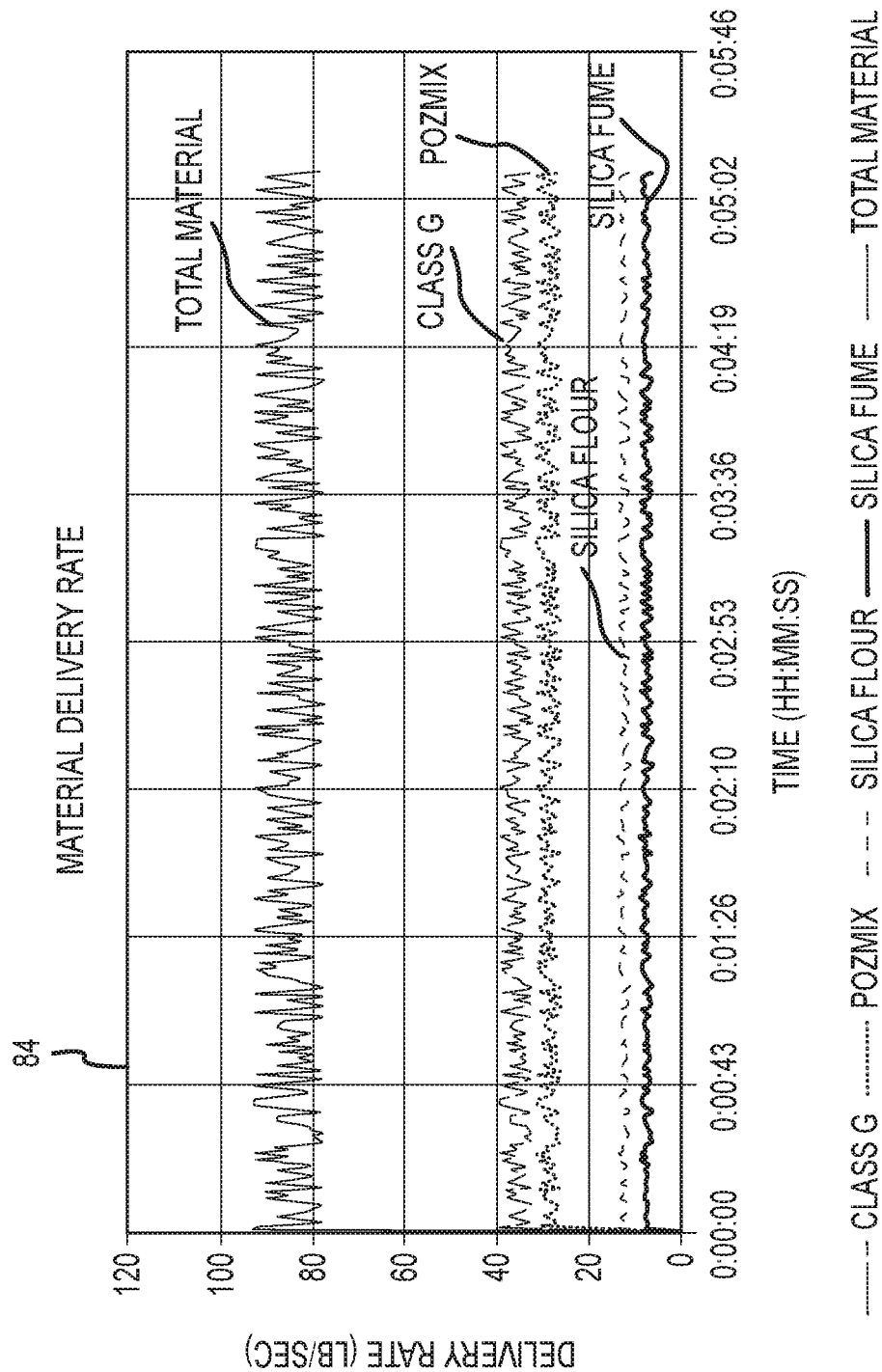
FIGS. 8-12 show additional user interfaces in the form of example data charts.

FIG. 8 shows a sample Material Delivery Rate Chart 84. The Material Delivery Chart 84 displays the delivery rates of all component materials as a function of time. For example, the graph of this figure shows the delivery rates for the four materials selected from the user interface of FIG. 7, namely: Class G, Pozmix, Silica Flour, Silica Fume, and the total material delivered. The graph of FIG. 8 more particularly shows the delivery rates along the Y-axis and time along the X-axis. From the relatively straight/linear and horizontal lines graphed, it can be concluded there was a successful delivery of the ingredients/components. That is, since there was a substantially steady delivery rate for each ingredient, this indicates that there were adequate controls in place to add the ingredients to the batch for the correct component materials at the correct times enabling the ingredients to be adequately mixed and delivered downstream. For each of the materials delivered, there are relatively small measured variances in delivery rates over time, but it can be seen that the variances each fall within a substantially uniform range. Further, it can be seen that for the Class G material, it had the largest measured variances range which might be expected considering that is the material which has the greatest total weight delivered within the selected product batch. It can also be concluded there was no apparent back-up or stoppage of material delivery or excessive delivery of any particular ingredient/component, which would show on the graph as an irregular delivery rate. For example, had there been a problem during delivery, one or more of the materials delivered would show on the graph as not being uniformly delivered over time, and such an anomaly could be graphically represented by a sloping line, or a line which clearly falls out of an acceptable measured variance range. Therefore, it can be appreciated that the Material Delivery Rate Chart provides the user a quick visual check or confirmation that there was a successful blending operation in which the desired component materials were delivered at the correct amounts. This Chart may also be stored for historical records to confirm quality control at a project.

Figure 9:
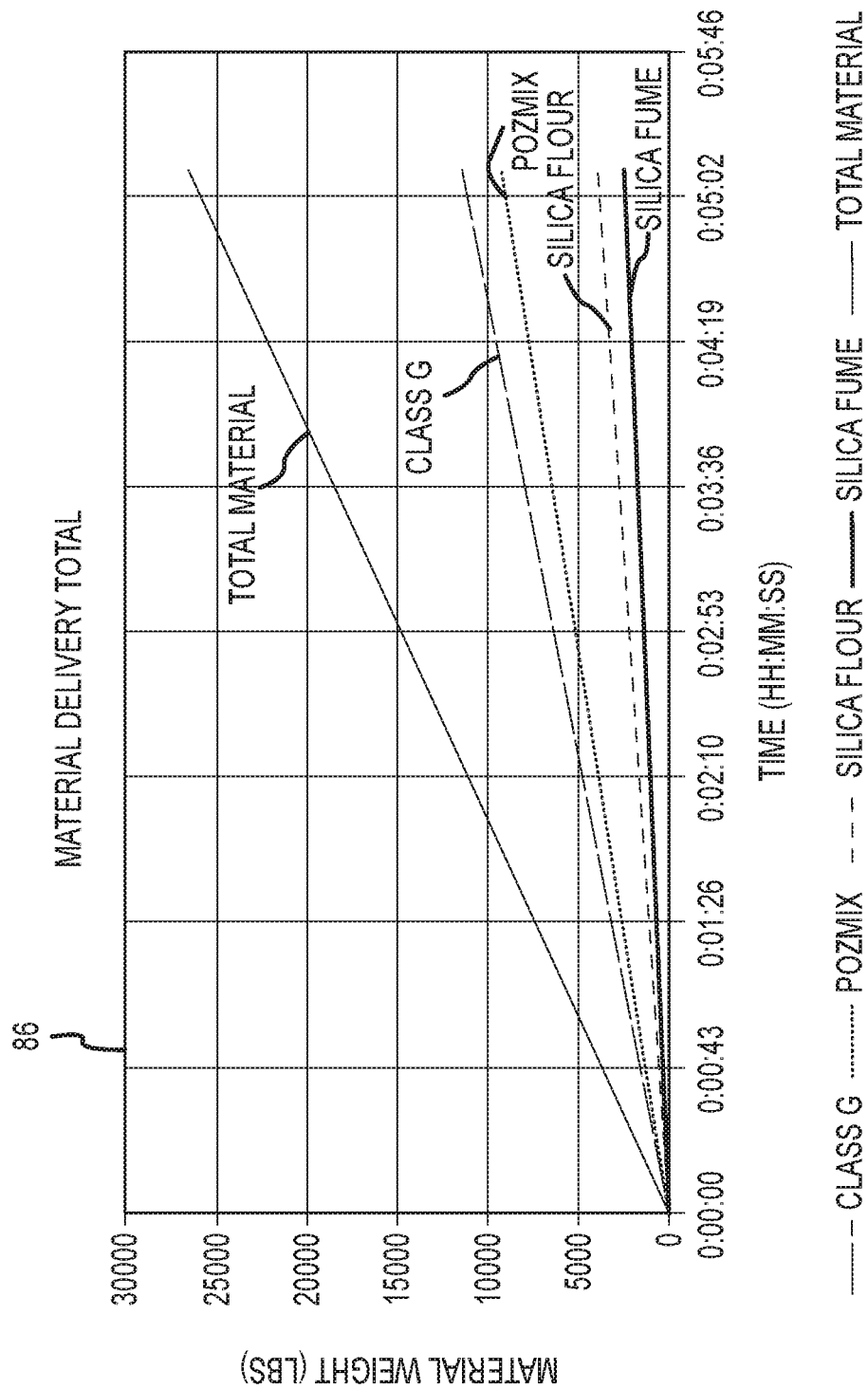

FIG. 9 shows a sample Material Delivery Total Chart 86. The Material Delivery Total Chart displays the total weight of the ingredients delivered as a function of time. More specifically, the graph shows the material weight along the Y-axis and time along the X-axis. For example, the graph shows the amount of ingredients delivered for the materials selected in the input screen of FIG. 7, namely: Class G, Pozmix, Silica Flour, Silica Fume, and the total material delivered. Because this Chart displays a cumulative product delivery over time, there are sloping lines which show linear increases in amounts of each of the component materials being delivered. If there would have been any problems in delivering the component materials, this would have been shown in this Graph by non-linear lines for any one of the component materials not being properly delivered. This Chart provides the user yet another visual check or confirmation that there was a successful blending operation.

Figure 10:
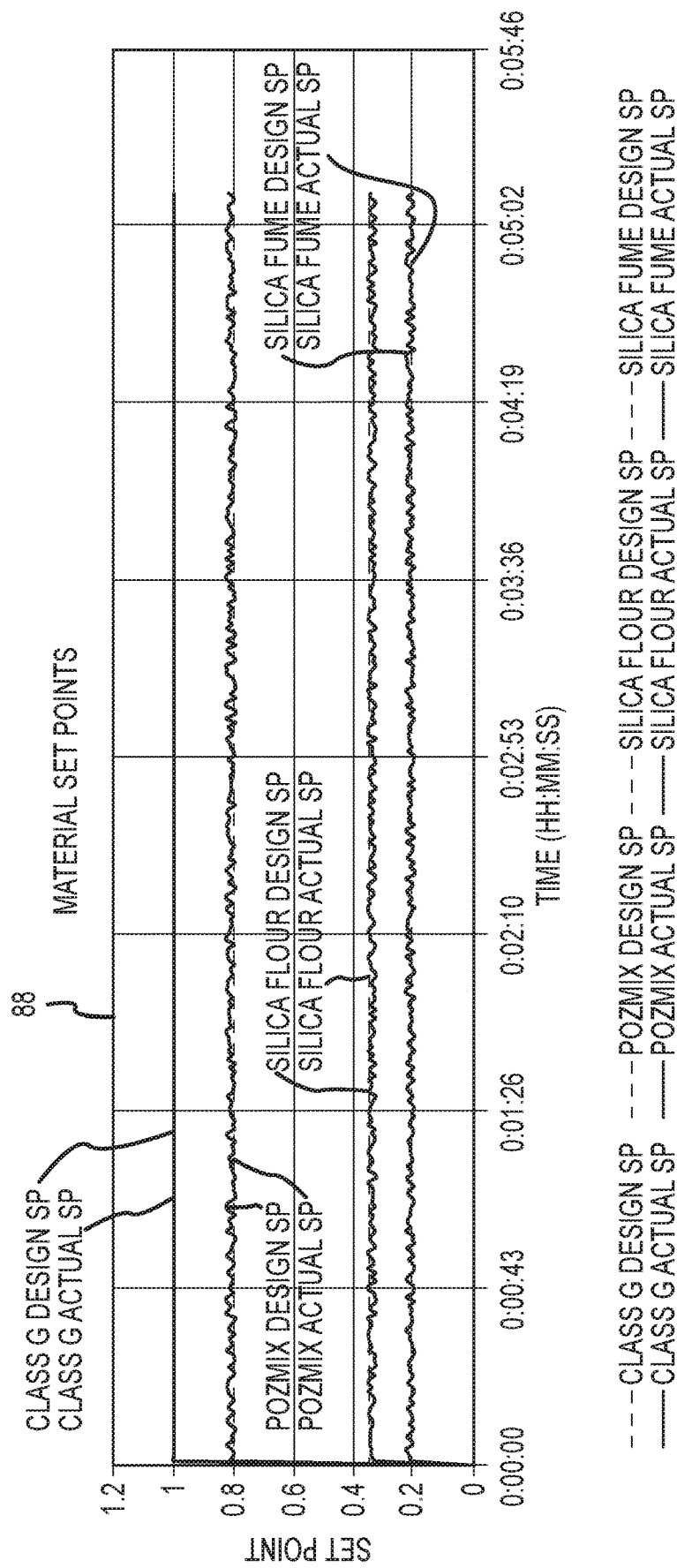

FIG. 10 shows a sample Material Set Points Graph 88. The Material Set Point Graph allows a user to compare the designed and current material ratio set point to ensure that the products are being delivered as designed. In this example, the Graph shows the set points, both designed and actual, for each of the materials selected in the input screen shown in FIG. 7, namely: Class G, Pozmix, Silica Flour, and Silica Fume. The graph shows the set point on the Y-axis and time on the X-axis. For each material, the designed set point is shown in dotted lines, while the actual set point is shown in a solid line. Accordingly, if any of the solid lines deviate from the corresponding dashed line, a user knows that the products are not being delivered as designed, and therefore, the user may make adjustments. For example, if a material set point for a particular component material is well below the actual set point measured, then adjustments can be made to the corresponding throttling valve such that excess material is not delivered. Inversely, material design set point for a particular component material is well above the actual set point measured, then adjustments will be made to the corresponding throttling valve, automatically/manually, such that greater material can be delivered.

Figure 11:
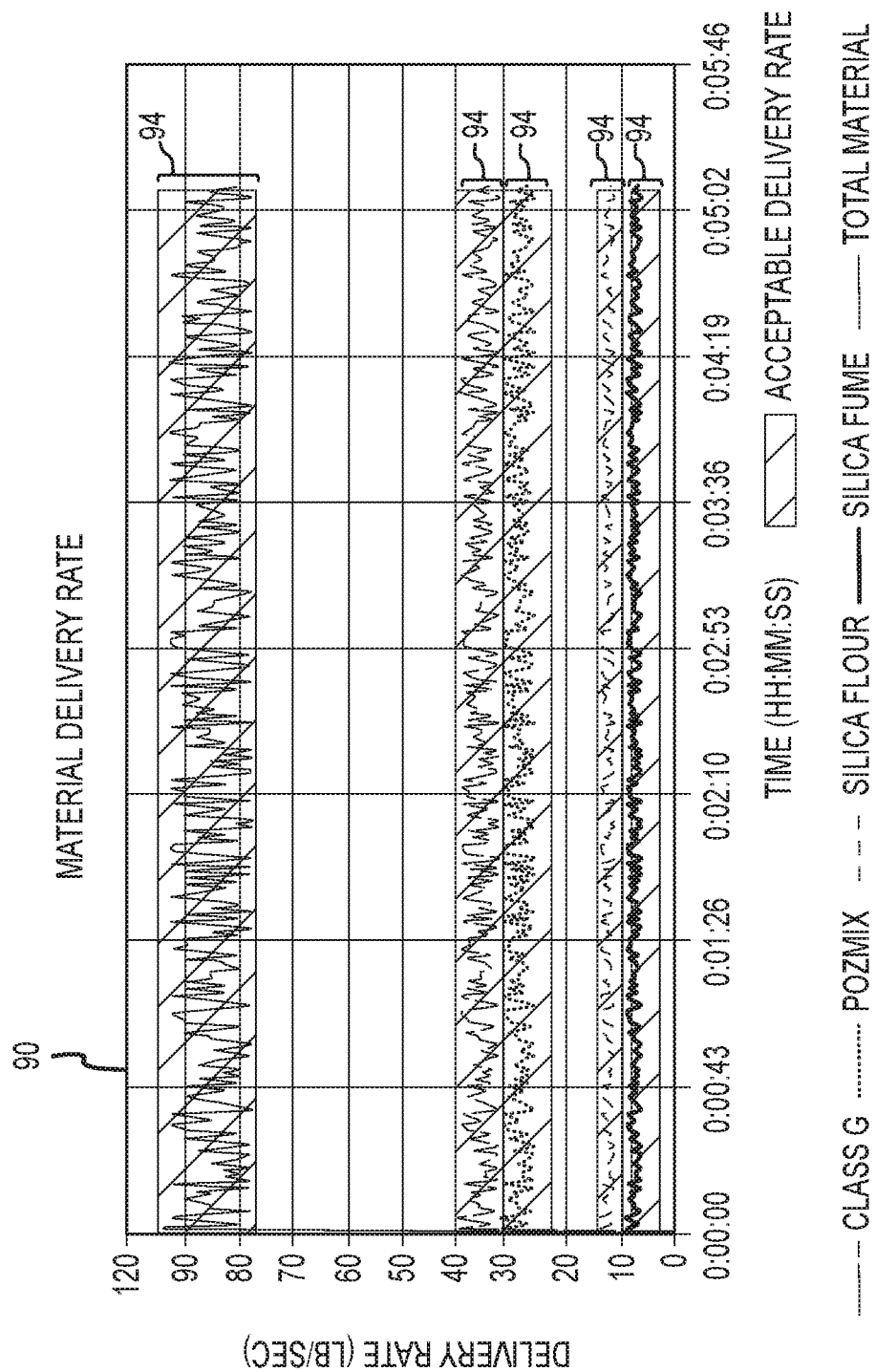

FIG. 11 shows another example Material Delivery Rate Graph 90, similar to the Material Delivery Rate Graph 84 of FIG. 8, but further illustrating allowed ranges or tolerances 94 for delivered materials. These allowed ranges/tolerances are shown with corresponding upper and lower bounds covering the respective graphed delivery rates. These allowed ranges/tolerances may be used in a number of ways to further assist the user in validating that a successful delivery has taken place. For example, if any one of the delivered materials or the total materials delivered at any particular time falls outside of the upper and lower bounds, this may signify a particular system problem which requires troubleshooting and repair. This out of bounds or out of range condition could further signify that the delivery rate was less than or exceeded the capability of a flowmeter to accurately measure flow, or can otherwise signify that a particular component in the system was not capable of operating as its optimal condition.

Figure 12:
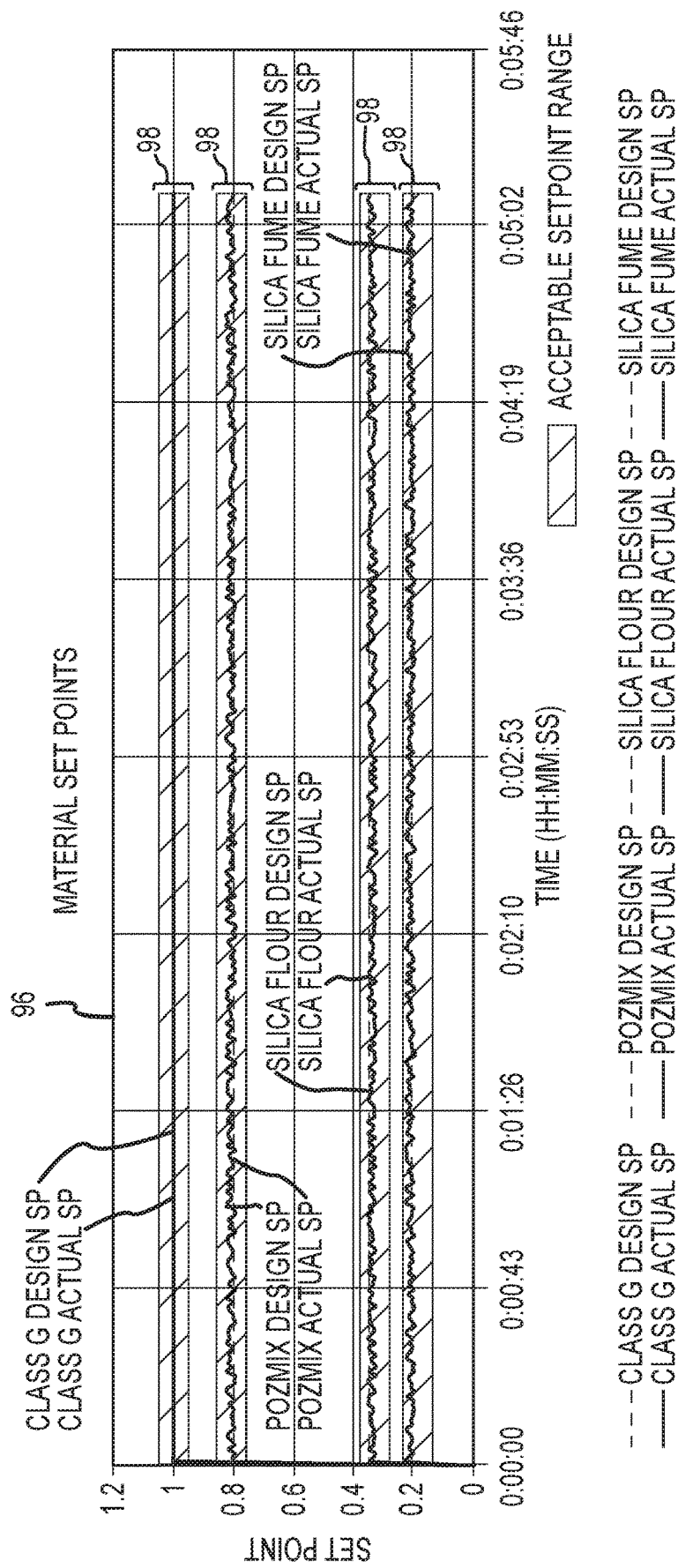

FIG. 12 shows another sample Material Set Points Graph 96, similar to the Material Set Points Graph 88 of FIG. 10, but further illustrating allowed ranges or tolerances 98 for actual set points that may deviate from the calculated design set points. In this regard, the data from this graph may also be used to troubleshoot or repair the system, or to otherwise validate the accuracy of deliveries have taken place. For example, if any one of the actual set points was out of range, this could be tracked to a defective flowmeter in the corresponding supply line, a defective valve, a clogged supply line, etc. Further, this data can be used to validate system specifications such as whether it is possible to consistently and accurately deliver selected component materials at selected rates.

From the foregoing, it should be apparent that the invention comprises a mixing or blending apparatus, a method of mixing/blending selected component materials, and a system to execute the method to include various mechanical/electrical elements making up the system. This system is automated in that it is computer-controlled to enable accurate and precise delivery of component materials to create a product mixture, and thus enabling the product mixture to be delivered to a selected jobsite. Automation of the system includes various user interfaces which enable a user to monitor the status of all component materials within the system in real-time, as well as to provide various visual aids in the form of user interfaces which further enhance the ability of the user to monitor and control the system.

The foregoing discussion of the invention is presented for purposes of illustration and description. Further, the description is not intended to limit the invention to the form disclosed herein. Consequently, variation and modification commensurate with the above teachings, within the skill and knowledge of the relevant art, are within the scope of the present invention. The embodiment described hereinabove is further intended to explain the best mode presently known of practicing the invention and to enable others skilled in the art to utilize the invention as such, or in other embodiments, and with the various modifications required by their particular application or uses of the invention.

What is claimed is:

1. A method of mixing dry component products to produce a blended dry well cement that is mixable with water to produce a pumpable, settable well cement slurry, said method comprising:
    providing a plurality of tanks, each of the tanks holding a respective one of said component products for said cement;
    providing a plurality of supply pipes wherein each of the plurality of supply pipes has a first and a second end, the first end being connected to a corresponding tank of the plurality of tanks;
    providing a common mixing pipe, wherein the second end of each of the plurality of supply pipes is connected to an upstream end of the mixing pipe;
    wherein at least one of the plurality of supply pipes or the mixing pipe includes a static mixer disposed therein to mix products passing through the pipe having the static mixer;
    wherein at least one of the plurality of supply pipes includes a mass flow meter to measure a mass of the component products passing through the supply pipe monitored by the mass flow meter;
    wherein at least one of the plurality of supply pipes includes a flow throttling valve to control a flow of the component products passing through the supply pipe controlled by the flow throttling valve;
    providing a controller communicating with the mass flow meter and the flow throttling valve to automatically determine control parameters for delivery of the component products to include material weights or delivery rates of the component products;
    determining a desired composition for the cement; and
    delivering each of the component products through a respective one of the respective supply pipes at a determined rate such that the cement is formed in the mixing pipe having the desired cement composition; and
    wherein at least one current material ratio set point value is determined and subsequently utilized by said controller to control delivery of the component products to achieve the desired cement composition.

2. The method, as claimed in claim 1, wherein:
    said controller communicates with said mass flow meter and said throttling valve such that a measured mass of a selected component product as an input to said controller allows said controller to issue a control command to the throttling valve to meter a desired amount of the selected component product through its respective supply pipe; and
    providing at least one user interface generated by said controller for viewing by a user, said user interface including at least one of (1) a material delivery rate graph illustrating a delivery rate of at least one component product over time, (2) a material delivery total graph illustrating a total delivery of at least one component product over time, and (3) a material set point graph illustrating a design set point and an actual set point measurement over time for at least one component product.

3. The method of claim 1, wherein the mixing pipe includes a static mixer.

4. The method of claim 1, wherein the mixing pipe includes a coarse static mixer and a fine static mixer.

5. The method of claim 1, wherein said component products are mobilized pneumatically.

6. The method of claim 1, wherein said component products and said cement are mobilized pneumatically.

7. The method of claim 1, wherein said method comprises injecting pressurized air into the supply pipes or the mixing pipe.

8. The method of claim 7, wherein said pressurized air is injected through nozzles provided in the supply pipes or the mixing pipe.

9. A method of cementing an oil and gas well, said method comprising:
    providing the dry blended cement according to the method of claim 1;
    mixing said cement with water to produce the pumpable, settable cement slurry; and
    pumping said cement slurry into said well.

10. A method of cementing an oil and gas well, said method comprising:
    providing the dry blended cement according to the method of claim 2;
    mixing said cement with water to produce the pumpable, settable cement slurry; and
    pumping said cement slurry into said well.

11. A method of cementing an oil and gas well, said method comprising:
    providing the dry blended cement according to the method of claim 3;
    mixing said cement with water to produce the pumpable, settable cement slurry; and
    pumping said cement slurry into said well.

12. A method of cementing an oil and gas well, said method comprising:
    providing the dry blended cement according to the method of claim 4;

mixing said cement with water to produce the pumpable, settable cement slurry; and pumping said cement slurry into said well.

13. A method of cementing an oil and gas well, said method comprising:

providing the dry blended cement according to the method of claim 5;

mixing said cement with water to produce the pumpable, settable cement slurry; and pumping said cement slurry into said well.

14. A method of cementing an oil and gas well, said method comprising:

providing the dry blended cement according to the method of claim 6;

mixing said cement with water to produce the pumpable, settable cement slurry; and pumping said cement slurry into said well.

15. A method of cementing an oil and gas well, said method comprising:

providing the dry blended cement according to the method of claim 7;

mixing said cement with water to produce the pumpable, settable cement slurry; and pumping said cement slurry into said well.

16. A method of cementing an oil and gas well, said method comprising:

providing the dry blended cement according to the method of claim 8;

mixing said cement with water to produce the pumpable, settable cement slurry; and pumping said cement slurry into said well.

17. The method of claim 1, wherein each of said supply pipes has:

a mass flow meter to measure a mass of the component product passing through said supply pipe monitored by said mass flow meter; and a flow throttling valve to control a flow of the component product passing through said supply pipe controlled by said flow throttling valve.

18. A method of cementing an oil and gas well, said method comprising:

providing the dry blended cement according to the method of claim 17, mixing said cement with water to produce the pumpable, settable cement slurry; and pumping said cement slurry into said well.

19. The method of claim 8, wherein each of said supply pipes has:

a mass flow meter to measure a mass of the component product passing through said supply pipe monitored by said mass flow meter; and a flow throttling valve to control a flow of the component product passing through said supply pipe controlled by said flow throttling valve.

20. A method of cementing an oil and gas well, said method comprising:

providing the dry blended cement according to the method of claim 19;

mixing said cement with water to produce the pumpable, settable cement slurry; and pumping said cement slurry into said well.

* * * * *

UNITED STATES PATENT AND TRADEMARK OFFICE
CERTIFICATE OF CORRECTION

PATENT NO. : 10,783,678 B2
APPLICATION NO. : 15/245839
DATED : September 22, 2020
INVENTOR(S) : Lucas Albrighton, T. J. McClure and Aaron James It is certified that error appears in the above-identified patent and that said Letters Patent is hereby corrected as shown below:

In the Specification

In Column 10, at Line 8, after "include an", delete "inner ring"

In Column 13, at Line 10, the equation should read as follows:

$$\text{Product A Current Material Ratio Set Point} = \frac{\text{Product A Delivery Rate (lb/sec)}}{\text{Controlling Material Delivery Rate (lb/sec)}}$$

In the Claims

In Claim 19, in Column 18, at Line 16, delete "claim 8", and insert therein -- claim 3 --

Signed and Sealed this
Twenty-seventh Day of October, 2020

Andrei Iancu
*Director of the United States Patent and Trademark Office*